J. F. Thomas,
Chuck.

No. 108,535.      Patented Oct. 18, 1870.

Witnesses,
L. Hailer
Thomas Taylor Jr.

Inventor,
John F. Thomas
by Dodge & Munn
Atty

UNITED STATES PATENT OFFICE.

JOHN F. THOMAS, OF ILION, NEW YORK.

Letters Patent No. 108,535, dated October 18, 1870.

IMPROVEMENT IN CHUCKS.

The Schedule referred to in these Letters Patent and making part of the same

*To all whom it may concern:*

Be it known that I, JOHN F. THOMAS, of Ilion, in the county of Herkimer and State of New York, have invented certain Improvements in Chucks, of which the following is a specification, reference being had to the accompanying drawing.

My invention relates to chucks for holding drills and similar small articles to be used in a lathe; and The invention consists in the novel construction of the chuck, as hereinafter more fully explained.

Figure 3:
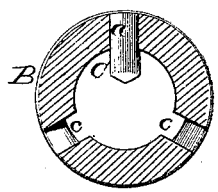

Figure 3, a cross-section of a portion detached; and

Figure 4:
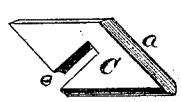
Figure 2:
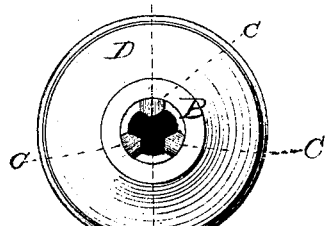
Figure 2 is a front-end view.

Figure 4 is a perspective view of one of the jaws removed from the chuck.

Figure 1:
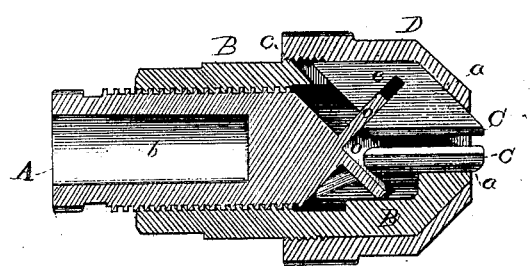
Figure 1 is a longitudinal section, taken on the line *x x* of fig. 2.

In constructing my improved chuck, I provide a solid piece of metal, A, of cylindrical form, and cut on its exterior surface a screw-thread nearly its entire length, as shown in fig. 1. Near its front end, I turn it down, or cut it away, so as to form in it a V-shaped groove, circumferentially, and thereby leave at the end a conical projection, the base or larger portion of the cone being at the extremity. In the end of this projection I then form a corresponding conical recess, thus producing a conical flange, *o*, as represented in fig. 1, at the front end of the part A.

This piece A has a hole, *b*, bored longitudinally in its rear end, for the insertion of a stem by which to attach the chuck to the mandrel or arbor of the lathe; or, if preferred, it may have a screw-thread cut in it, so that it can be screwed onto the lathe-arbor, either plan being optional, and both being common.

I then provide a sleeve, B, of proper size to fit over the central plug A, and having a corresponding screw-thread on its interior, as shown in fig. 1.

At its front end, this sleeve B is made conical on its exterior, and its bore or interior opening is considerably reduced in size for a little distance from its front end. It has also cut in its front end three longitudinal radial slots, for the reception of the sliding jaws C, these slots, at their rear end, terminating in inclined shoulders, *c*, as represented in figs. 1 and 3, the inclination of these shoulders being from the front rearward, and from the center outward, at an angle corresponding to that of the rear end of the jaws C.

I then provide three sliding jaws, C, of the proper thickness to fit in the slots of sleeve B. These jaws have their front and rear ends beveled or inclined at an angle corresponding with that of the conical end of the sleeve B, as shown in figs. 1 and 4, the latter illustrating one of the jaws detached, and showing more clearly their form.

Each of the jaws has a slot, *e*, cut in it at a right angle to the inclination of its ends, and corresponding with the conical flange *o* on the front end of the cylinder or plug A.

I then provide an outer sleeve or shell, D, of proper size to fit over the sleeve B, with its front end having a corresponding taper, as shown in fig. 1, this shell being secured to the sleeve B by a screw-thread near its rear end, as shown.

The parts being thus constructed, the cylinder A is screwed into the sleeve B. The jaws C are then inserted in the grooves in the sleeve B in such a position that the conical flange *o* of the cylinder A shall enter their slots *e*, and then the shell D is screwed on over them, as shown in fig. 1. When thus arranged, it will be seen that, if the sleeve B be screwed backward on the cylinder A, the jaws C will be made to protrude at the front end, and that, as their front inclined edges or ends bear against the interior conical surface of the shell D, and their lower inner corners against the inner surface of the conical flange *o*, they will, as they are forced forward, be also made to approach each other uniformly, converging at the center, thus grasping and firmly holding any article placed between them, a reverse movement, of course, retracting the jaws.

Having thus described my invention,

What I claim is—

A chuck, consisting of the shank A, having the conical flange *o* at its front end, in combination with the jaws C, having the inclined groove *e*, with the nut B and sleeve D, all constructed and operating substantially as described.

JOHN F. THOMAS.

Witnesses:
HARRISON BRANE,
MORRIS DEANE.